G. V. PADE AND C. T. NEITZEL.

NEEDLE FOR HAND EMBROIDERY AND SIMILAR WORK.

APPLICATION FILED OCT. 19, 1920.

Reissued Nov. 30, 1920. 14,997.

WITNESS

INVENTORS

George V. Pade

Conrad T. Neitzel

By Archibald Cox their ATTORNEY

UNITED STATES PATENT OFFICE.

GEORGE V. PADE AND CONRAD T. NEITZEL, OF DALLAS, TEXAS, ASSIGNORS TO AMERICAN ART NEEDLE COMPANY, A CORPORATION OF DELAWARE.

NEEDLE FOR HAND-EMBROIDERY AND SIMILAR WORK.

14,997. Specification of Reissued Letters Patent: Reissued Nov. 30, 1920.

Original No. 1,309,601, dated July 8, 1919, Serial No. 293,545, filed April 29, 1919. Application for reissue filed October 19, 1920. Serial No. 418,100.

*To all whom it may concern:*

Be it known that we, GEORGE V. PADE and CONRAD T. NEITZEL, citizens of the United States, and residents of Dallas, in the county of Dallas, State of Texas, have invented certain new and useful Improvements in Needles for Hand-Embroidery and Similar Work, of which the following is a specification.

Our invention relates to improvements in needles and refers particularly to that class of hand needles used for embroidering or ornamental needlework and to the novel arrangement and construction of such a needle.

It is the principal object of our invention to provide a needle of this type which is peculiarly adapted to embroidery, ornamental needle work, etc., on account of the rapidity and ease with which such work can be accomplished.

Another object of our invention lies in the simplicity of the needle and its inexpensive manufacture.

Our invention will be more fully understood from the following description taken in connection with the accompanying drawing forming part hereof, in which—

Figure 1:
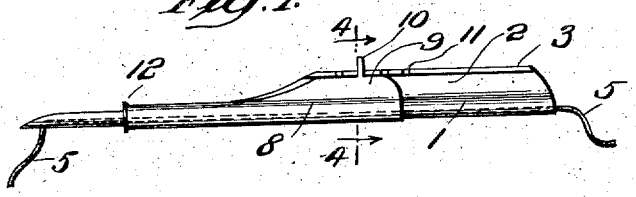
Figure 1 is a side elevational view of a needle embodying our invention.
Figure 2:
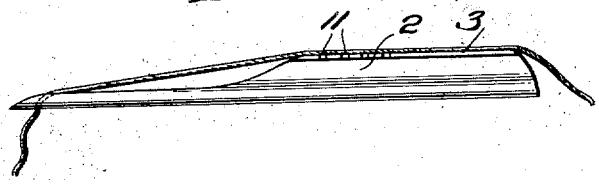
Fig. 2 is a similar view with the gage of the needle removed.
Figure 3:
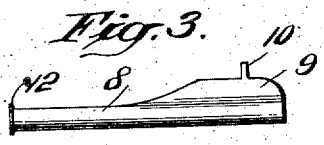
Fig. 3 is a side elevational view of the gage.
Figure 4:
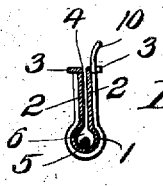
Fig. 4 is a cross sectional view taken on line 4—4 of Fig. 1.
Figure 5:
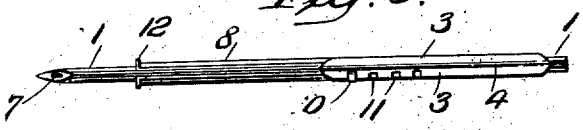
Fig. 5 is a top view of the needle.
Figure 6:
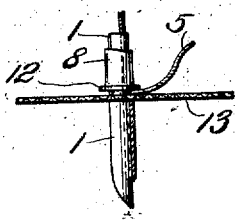
Fig. 6 is a vertical sectional view, part of the needle broken away, showing the manner of operation.

Referring to the drawings, the body 1 of the needle is constructed preferably of metal and is tubular or hollow, the portion constituting the handle extending outwardly from the hollow portion into flanges 2—2 and the ends 3—3 of the flanges are bent at right angles to the body of the needle. By reference to Fig. 4 of the drawings it will be noted that the sides or flanges 2—2 do not come entirely together, but leave a slit or opening 4 for the threading or passage of the thread 5 into the channel 6 of the needle. The manner of threading the needle is illustrated in Fig. 2, the thread being passed through the eye 7 and stretched or pulled slightly to force it into the channel 6. It is thus seen that a free and unobstructed threading passage extends outwardly from the thread channel 6.

Arranged to slide over the body 1 of the needle is a complemental piece or gage 8. This gage has flanges 9—9 similar to the flanges 2—2 on the body of the needle and the gage is similarly channeled or slit to allow of the passage of the thread 5. A small projection 10 formed in one piece with the gage 8 is adapted to register with the notches 11 on the lips 3—3 of the flanges 2—2.

The forward end of this gage is flared outwardly as at 12 so that as the needle is pushed through the cloth 13 the end 12 of the gage will allow the point of the needle to advance in the cloth only so far, depending upon which of the notches 11 is registered with projection 10. It will be observed that whether the gage 8 is on the body part 1 of the needle or not, there is an unobstructed outwardly extending threading passage through which the needle is threaded.

The operation of the needle is simple. It is threaded in the manner explained above and the point pushed through the cloth on the design to be worked and the needle withdrawn. When the needle is pulled back a loop is formed. This loop can be shortened or lengthened as desired, it being held in place by the texture of the cloth. The lengthening or shortening of the loop gives the design such as flowers, etc., a raised appearance on the cloth opposite the needle, the design toward the needle being more or less flat. These loops can be trimmed off giving the French chenille effect, and when the loop is short and left uncut the French knot effect is obtained. A short loop will also give the effect of bead work.

Having thus described the nature and objects of our invention, what we claim as new and desire to secure by Letters Patent is—

1. A needle for hand embroidery and the like, comprising a tubular body pointed at one end and open at one side, said tubular body having a flange projecting laterally therefrom at said opening and provided with a series of notches, and a tubular gage member having an opening extending longitudinally thereof, said gage member being slidable on the tubular body of the needle and provided with a projecting part adapted to engage the notches in the flange of the tubular body.

2. A needle for hand embroidery and the like, comprising a tubular body pointed at one end and open at one side, said tubular body having a flange projecting laterally therefrom at said opening, and provided with a series of notches, and a tubular gage member having an opening extending longitudinally thereof with spaced longitudinal flanges projecting therefrom at said opening, said last mentioned flanges being disposed at opposite sides of the lateral flange of the body, and one of said flanges of the gage fitting against one side of the flange of the tubular body, and having a part projecting above the flange of the tubular body and adapted to engage the notches therein.

3. A device for hand embroidery and the like, comprising a tubular body constituting a needle and handle, the tubular body being open along one side substantially throughout its length and having oppositely disposed flanges on the handle and projecting laterally therefrom at said opening, said flanges serving as a guide for entering the thread into the longitudinal opening of the tubular body.

4. A needle for hand embroidery and the like, comprising a tubular body pointed at one end, the tubular body being open along one side and having spaced oppositely disposed flanges projecting from the body at said opening, said flanges having outer marginal portions bent outwardly and a tubular gage member having an opening extending longitudinally thereof and spaced flanges projecting laterally from the same at the said opening, the guard being slidable on the tubular body with the flanges of the guard engaging the outer face of opposite flanges of the body beneath the outwardly bent outer marginal portions of the flanges of the body, the outwardly bent marginal portions of one of the flanges of the body being provided with a series of notches, and one flange of the gage member being provided with a part projecting above the outwardly bent marginal portions of the flanges of the tubular body and adapted to engage the notches in said outwardly bent marginal portion.

5. A needle for hand embroidery and the like, comprising a tubular metal body pointed at one end and open at one side, said body having a flange projecting laterally therefrom at said opening, and a tubular sheet metal gage member having an opening extending longitudinally thereof and slidable on the tubular needle body, said gage member being provided with an outwardly flared lower end portion to engage the work.

6. A needle for hand embroidery and the like, comprising a tubular body pointed at one end, the tubular body being open at one side and having oppositely disposed flanges projecting laterally from the body at said opening, and a tubular gage member open along one side and slidable on the tubular body.

7. A needle for hand embroidery and the like, comprising a tubular body pointed at one end, the tubular body being open at one side and having a flange projecting laterally therefrom at said opening, the flange being provided with a series of notches, and a gage member open along one side and slidable on the tubular body, said gage member being provided with a part adapted to engage the notches in the said flange.

8. A needle for hand embroidery and the like, formed from a piece of sheet metal bent upon itself to provide a main tubular thread receiving part and a trough like part at one side thereof.

9. A needle for hand embroidery and the like, comprising a tubular body pointed at one end, the tubular body being open at one side and having a flange projecting laterally therefrom at the said opening, and a tubular gage member open along one side and slidable on the tubular needle body, one of said parts being provided with a series of notches and the other part provided with a projection adapted to engage the notches of the first mentioned part.

10. A needle for hand embroidery and the like, formed from a piece of sheet metal folded upon itself to provide a main tubular thread receiving body part open at one side and provided with flanges extending laterally therefrom at said opening, in combination with a gage formed from a piece of sheet metal and having a tubular part open at one side and with flanges projecting laterally therefrom at the opening, the gage being slidable on the first mentioned part.

11. A needle for hand embroidery and the like comprising a tubular body of which one end constitutes a point and of which the other end constitutes a handle, said tubular body being provided throughout its length with a thread receiving channel and having along one side of the point and of the handle a continuous and unobstructed threading passage extending outwardly from the thread receiving channel.

12. A needle for hand embroidery and the like comprising a tubular body of which one end constitutes a point and of which the other end constitutes a handle, said tubular body being provided throughout its length with a thread receiving channel, and a gage mounted on the body for regulating the depth the point of the needle shall penetrate the work, there being a continuous and unobstructed threading passage along one side of the point and of the handle and extending outwardly from the channel through the gage.

GEORGE V. PADE.
CONRAD T. NEITZEL.